US010282321B1

(12) United States Patent
Damary et al.

(10) Patent No.: US 10,282,321 B1
(45) Date of Patent: May 7, 2019

(54) SYSTEMS AND METHODS FOR SERIAL INPUT AND SELECTIVE OUTPUT MECHANISM FOR EXCHANGING DATA AT A NETWORK DEVICE

(71) Applicant: Marvell Israel (M.I.S.L.) Ltd., Yokneam (IL)

(72) Inventors: Yogev Damary, Hadera (IL); Moran Noiman, Kiryat Ono (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 15/875,491

(22) Filed: Jan. 19, 2018

Related U.S. Application Data

(60) Provisional application No. 62/448,163, filed on Jan. 19, 2017.

(51) Int. Cl.
| | |
|---|---|
| *G06F 3/06* | (2006.01) |
| *G06F 13/14* | (2006.01) |
| *G06F 13/16* | (2006.01) |
| *H04L 12/54* | (2013.01) |
| *H04L 12/879* | (2013.01) |
| *H04L 29/06* | (2006.01) |
| *H04L 12/70* | (2013.01) |

(52) U.S. Cl.
CPC .......... *G06F 13/1673* (2013.01); *G06F 13/14* (2013.01); *H04L 12/5601* (2013.01); *H04L 49/9026* (2013.01); *G06F 2003/0691* (2013.01); *H04L 69/22* (2013.01); *H04L 2012/5681* (2013.01)

(58) Field of Classification Search
CPC ............... G06F 3/0656; G06F 3/0659; G06F 2003/0691; G06F 5/10; G06F 7/76; G06F 7/78; G06F 13/14; G06F 13/1626; G06F 13/1673; G06F 13/4004; G06F 13/4009; G06F 13/4059; H04L 12/5601; H04L 49/90; H04L 49/9057; H04L 69/22; H04L 2012/5681
See application file for complete search history.

(56) References Cited

U.S. PATENT DOCUMENTS

| | | | | |
|---|---|---|---|---|
| 2009/0034548 A1* | 2/2009 | Soni | ..................... | H04L 49/90 370/412 |
| 2012/0079150 A1* | 3/2012 | Aoki | ..................... | G06F 13/366 710/110 |
| 2016/0154753 A1* | 6/2016 | Gittins | ..................... | G06F 13/1663 710/117 |
| 2018/0143921 A1* | 5/2018 | Jiang | ..................... | G06F 13/38 |

* cited by examiner

*Primary Examiner* — Thomas J Cleary (57) ABSTRACT

Embodiments herein use a single buffer that comprises a plurality of serially connected data cells to serially store data attributes and the respective data source identifiers from incoming data requests such that each stored data source identifier is used to match with a response message that corresponds to a respective data request. When a response message is received at the data interface, the data interface searches among the previously stored data attributes at the single buffer and selectively outputs a previously stored data attribute that corresponds to a data request to match with the response message. The data interface then uses information from the previously stored data attribute to route the response message to the data source that originates the data request.

20 Claims, 6 Drawing Sheets

SYSTEMS AND METHODS FOR SERIAL INPUT AND SELECTIVE OUTPUT MECHANISM FOR EXCHANGING DATA AT A NETWORK DEVICE

CROSS-REFERENCE TO RELATED APPLICATION

This disclosure claims the benefit under 35 U.S.C. § 119(e) of U.S. Provisional Patent Application No. 62/448,163, filed Jan. 19, 2017, which is hereby incorporated by reference herein in its entirety.

FIELD OF USE

This disclosure relates to data interfaces, and specifically, to systems and methods for serial input and selective output mechanism for exchanging data at a network device.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In communication systems, data can be sent from multiple data sources to multiple data destinations via a single gateway at a data interface, which usually limits the amount of data requests that the data interface is allowed to issue. For example, the single gateway receives a number of data requests from a number of data sources, and then forwards each of the data requests to a corresponding destination. In response to the number of data requests, the data interface subsequently receives a number of responses from the multiple destinations. To match each response with a corresponding data request, the order of the received responses is usually kept for each data source. For example, existing systems employ a buffer matrix at the data interface to store the data requests and their related attributes. Each row of the buffer matrix is a first-in-first-out (FIFO) buffer designated for data requests from the same data source. Thus, when a response intended for a data source is received, the response is matched with the corresponding data request that is output from the FIFO buffer corresponding to the respective data source. However, the buffer matrix structure often consumes significant area on a circuit when the data interface needs to handle data requests from a large number of data sources. In addition, the FIFO buffer designated for a particular source within each row of the buffer matrix is usually only partially filled, leading to inefficient utilization of the buffer space.

SUMMARY

Embodiments described herein provide a network device operative to selectively exchange data between a plurality of different data sources and a plurality of different data destinations. The network device includes a first transceiver, a buffer, a push logic, a pop logic and a second transceiver. The first transceiver is configured to receive a plurality of data requests from a plurality of sources. The buffer is comprised of a plurality of serially connected register data cells configured to store data attributes and source identifiers corresponding to the plurality of data requests. The push logic configured to issue a push command. In response to the push command, the buffer is configured to serially store a new data attribute corresponding to a new data request at a tail register data cell of the plurality of serially connected register data cells. The pop logic is configured to issue a pop command. In response to the pop command, the buffer is configured to search from a head register data cell of the plurality of serially connected register data cells towards the tail register data cell to locate and selectively output a previously stored data attribute from an identified register data cell storing a same source identifier with a response source identifier contained in a newly received response message. The second transceiver is configured to receive a plurality of response messages including the newly received response message.

In some implementations, each register data cell from the plurality of serially connected register data cells includes a first memory segment designated to store a respective data attribute of a respective data request, and a second memory segment designated to store a respective source identifier of the same respective data request.

In some implementations, the plurality of serially connected register data cells includes a first register data cell and a second register data cell. The first register data cell is configured to store a first source identifier corresponding to the first data request. The second register data cell is configured to store a second source identifier corresponding to the second data request, and the second source identifier is different from the first source identifier.

In some implementations, each register data cell from the plurality of serially connected register data cells is connected to a data bus, and each register data cell is configured to transmit, via the data bus, stored content at the first memory segment or the second memory segment out of the buffer.

In some implementations, the buffer has a single input port at a first end of the buffer, the single input port being configured to receive data from the first transceiver. The buffer has a single output port connected to the data bus, the single output port being configured to output data out of the buffer from the data bus.

In some implementations, the push logic is configured to issue the push command in response to receiving the new data request at the first transceiver. In response to the push command, the buffer is further configured to: shift previously stored content at each of the plurality of serially connected register data cells to a respective next register data cell such that the tail register data cell is vacated; and store the new data attribute corresponding to the new data request at a first memory segment of the tail register data cell and a new source identifier corresponding to the new data request at a second memory segment of the tail register data cell.

In some implementations, the pop logic is configured to issue the pop command in response to receiving, at the second transceiver, a new response message including a response source identifier. In response to the pop command, the buffer is configured to read a first previously stored source identifier from a first memory segment designated to store a source identifier at a head register data cell that is closest to the second transceiver among the plurality of serially connected register data cells; extract the response source identifier from a data field corresponding to the response source identifier of the new response message; determine whether the first previously stored source identifier matches the response source identifier; when the first previously stored source identifier matches the response source identifier, retrieve and output a first previously stored data attribute from a second memory segment designated to store data attributes at the head register data cell; when the first previously stored source identifier does not match the response source identifier: continue moving to an adjacent register data cell towards a direction of the tail register data cell from the plurality of serially connected register data cells, until a second previously stored source identifier stored at a respective memory segment of the adjacent register data cell matches the response source identifier for the first time.

In some implementations, in response to the pop command, the buffer is further configured to: identify a matching register data cell that stores the second previously stored source identifier when the second previously stored source identifier that matches the response source identifier is identified for the first time; send a data attribute previously stored at the matching register data cell out of the matching register data cell via a data bus; transmit, via the data bus, the data attribute previously stored at the matching register data cell as a data output from the buffer; vacate the matching register data cell; and shift all stored content of a first subset of register data cells that are closer to the head register data cell than the matching register data cell to a respective adjacent register data cell towards the direction of the tail register data cell such that the matching register data cell is filled with stored content from a first register data cell adjacent to the matching register data cell.

In some implementations, the push logic and the pop logic are configured to issue the push command and the pop command at a same time. In response to the pop command and the issue command being issued at the same time, the buffer is configured to: locate the matching register data cell in response to the response source identifier in the response message; transmit the data attribute previously stored at the matching register data cell as a data output from the buffer; vacate the matching register data cell; shift all stored content of a second subset of register data cells that are closer to the tail register data cell than the matching register data cell to a respective adjacent register data cell towards the direction of the head register data cell such that the matching register data cell is filled with stored content from a second register data cell adjacent to the matching register data cell; vacate the tail register data cell; and store the new data attribute and the new source identifier corresponding to the new data request at the tail register data cell.

In some implementations, the network device further comprises a respective multiplexer connected to the respective register data cell for each register data cell from the plurality of register data cells. The respective multiplexer includes a first data input connected to a data output of the same respective register data cell, a second input connected to a data output from a first adjacent register data cell to the respective register data cell, and a third data input connected to a data output from a second adjacent register data cell to the respective register data cell, respectively. The respective multiplexer is configured to selectively output data to the respective register data cell, from one of the inputs of the respective multiplexer, in response to the pop command or the push command.

Embodiments described herein further include a method for exchanging data from different data sources to different data destinations in a network device. At a first transceiver, a plurality of data requests from a plurality of sources are received for storage in a buffer at a network device, the buffer comprised of a plurality of serially coupled register data cells. In response to receiving a new data request at the first transceiver, a push command is issued, by a push logic, to serially store a new data attribute and a new source identifier corresponding to the new data request at a tail register data cell of the plurality of serially connected register data cells. At a second transceiver, a new response message is received. In response to receiving the new response message, a pop command is issued, by a pop logic, to search from a head register data cell of the plurality of serially connected register data cells towards the tail register data cell to locate and selectively output a previously stored data attribute from an identified register data cell storing a same source identifier with a response source identifier contained in a newly received response message.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for using a single buffer that comprises a plurality of serially connected data cells to serially input and selectively output data attributes of data requests at a data interface for exchanging data between different data sources and different data destinations. Specifically, the single buffer has a similar physical structure as a single first-in-first-out (FIFO) buffer, with a single input port and a single output port. For example, a network device is sometimes used to exchange data between multiple sources and multiple destinations, e.g., a data request is sent from a source to a destination in expectation of a response message from the destination to the source. The network device includes a data interface to route the data request to the destination, and to match a received response message with a previously sent data request. To achieve this, data attributes (e.g., type of the data request, address of the source, identifier of the source, and/or the like) of data requests from different data sources are parsed from the data requests and stored at the data interface. When a response message is received, the data interface is configured to match the response message with previously stored data attributes from the original data request. A storage mechanism is thus needed to store and match data attributes of the data requests.

Embodiments herein use a single buffer that comprises a plurality of serially connected data cells to serially store data attributes and the respective data source identifiers from incoming data requests such that each stored data source identifier is used to match with a response message that corresponds to a respective data request. When a response message is received at the data interface, the data interface searches among the previously stored data attributes at the single buffer and selectively outputs a previously stored data attribute that corresponds to a data request to match with the response message. The data interface then uses information from the previously stored data attribute to route the response message to the data source that originates the data request.

Thus the serial-input-selective-output mechanism described herein employs a single buffer to store data attributes from all different data sources and output a stored data attribute to match with each received response message. In this way, circuit area consumption is improved, as the single buffer consumes much less circuit area as a buffer matrix that is traditionally used to store data attributes from different data sources.

Figure 1:
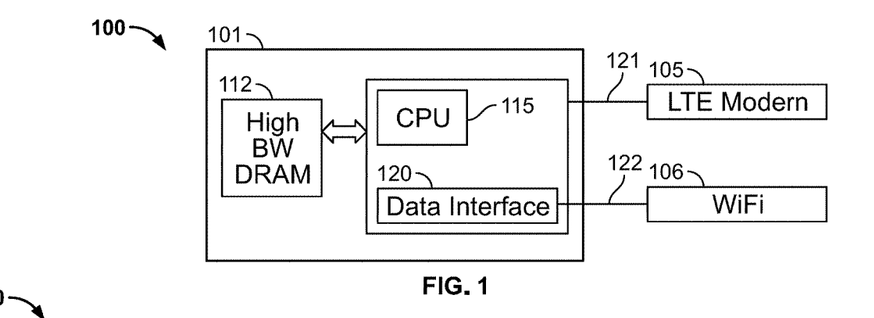
FIG. 1 is a block diagram illustrating an example network device having a data interface to exchange data between multiple data sources and multiple data destinations, according to some embodiments described herein.

FIG. 1 is a block diagram 100 illustrating an example network device 101 having a data interface to exchange data between multiple data sources and multiple data destinations, according to some embodiments described herein. For example, the network device 101 includes a central processing unit (CPU) 115, which reads and writes data from or into a high bandwidth storage element, e.g., a DRAM 112. In some implementations, the CPU 115 is configured to retrieve and execute instructions from the DRAM 112 to process data exchange at a data interface 120.

In some implementations, the network device 101 is connected to various communication modules, such as but not limited to a long-term evolution (LTE) modem 105 via a first data interconnect 121, or a Wi-Fi transceiver 106 via a second data connect 122, and/or the like. The network device 101 is configured to receive a number of data requests from various data sources and then route the number of data requests to their respective destinations. In response to the number of data requests, the network device 101 is configured to receive a number of response messages and then route the response messages to their respective data sources.

For example, the network device 101 is configured to receive a data request from a data source via the LTE modem 105. The data interface 120 at the network device 101 is configured to route the data request to the corresponding destination, e.g., via the Wi-Fi transceiver 106. For another example, in parallel, data requests can be sent from a Wi-Fi device (e.g., via the Wi-Fi transceiver 106) to the LTE modem 105, via the network device 101. Thus, in various scenarios, communications between various sources (e.g., CPU(s) 115, LTE modem sub-unit(s) 105 when each sub-unit is a data source, Wi-Fi transceiver sub-unit(s) 106 when each sub-unit is a data source, and/or the like) and various destinations (e.g., DRAM 112, Wi-Fi transceiver sub-unit(s) 106 when each sub-unit is a data source, and/or the like) are configured to be passed through a single interconnect, e.g., the data interface 120 at the network device 101. Further detail of the infrastructure of the data exchange at the data interface 120 is described in relation to FIG. 2 below.

Figure 2:
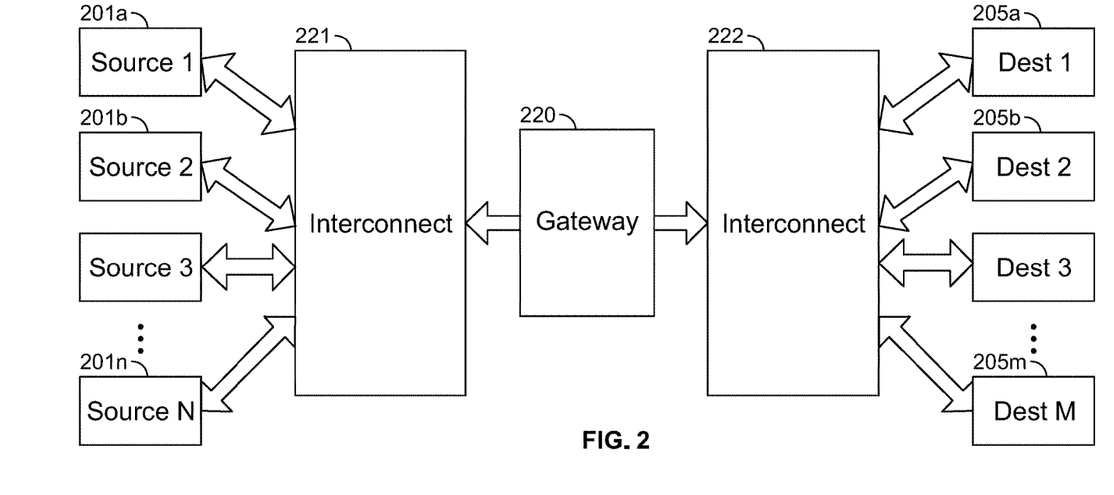
FIG. 2 is a block diagram illustrating an example data interface as shown in the network device in FIG. 1, where a serial-input-selective-output mechanism for data exchange is implemented, according to some embodiments described herein.

FIG. 2 is a block diagram 200 illustrating an example data interface 120 such as shown in the network device 101 in FIG. 1, where a serial-input-selective-output mechanism for data exchange is implemented, according to some embodiments described herein. The data interface (e.g., similar to 120 in FIG. 1) includes a first interconnect 221 (e.g., similar to 121 in FIG. 1) to receive data requests from a plurality of data sources 201a-n. For example, the first interconnect 221 is connected to the LTE modem 105 in FIG. 1. The data interface also includes a second interconnect 222 (e.g., similar to 122 in FIG. 1) to forward data requests to, or to receive response messages from a plurality of data destinations 205a-m. The first interconnect 221 and the second interconnect 222 are connected via a gateway 220, which hosts a single buffer that implements a serial-input-selective-output mechanism for data exchange between the first interconnect 221 and the second interconnect 222.

For example, when a data request is received at the data interface from one of the data sources 201a-n, the data request is forwarded to the gateway 220. The gateway 220 is in turn configured to parse the data request, e.g., by extracting information from the headers of data packets corresponding to the data request, to obtain data attributes such as, but not limited to, a type of the data request, a source identifier of the data request, a destination identifier of the data request, an expiration of the data request, an acknowledgement requirement of the data request, and/or the like. The gateway 220 is then configured to store the extracted data attributes such that when a response message is received at the gateway 220 from the intended destination of the original data request, the gateway 220 is configured to locate the stored data attributes to match with the response message by comparing a stored source identifier (stored with the respective data attributes of the same data request) with a response source identifier indicated in the response message. When a match is identified, the gateway 220 in turn routes the response message to the data source that originates the data request based on the stored data attributes of the corresponding data request.

Figure 3:
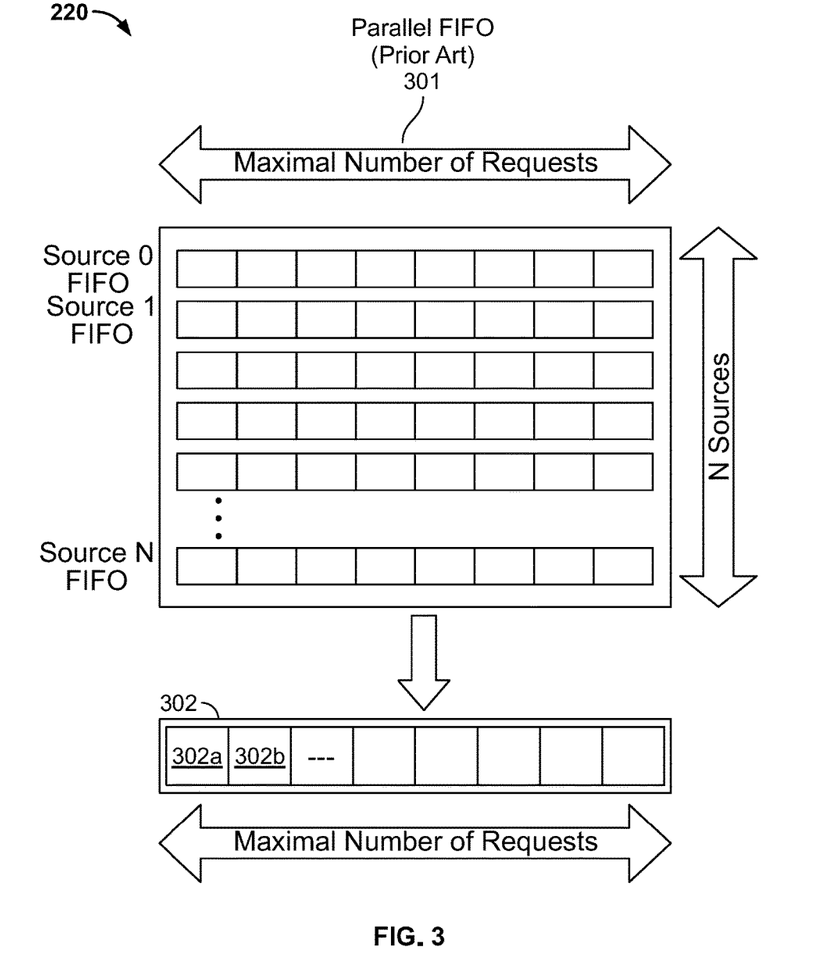
FIG. 3 is a block diagram illustrating a comparison of a buffer matrix of FIFO buffers to store data attributes from different data sources and a single buffer implementing a serial-input-selective-output mechanism to store data attributes (at the data interface in FIG. 2) from different data sources, according to some embodiments described herein.

FIG. 3 is a block diagram illustrating a comparison between a buffer matrix of conventional FIFO buffers 301 to store data attributes from different data sources and a single buffer 302 implementing a serial-input-selective-output mechanism to store data attributes (at the gateway 220 in FIG. 2) from different data sources, according to some embodiments described herein. As the gateway 220 is configured to receive data requests from different data sources 201a-n, conventionally a buffer matrix including a number of parallel FIFO buffers 301 is configured to designate each FIFO buffer, e.g., each row in the buffer matrix, for storing data attributes of data requests originated from the same source.

Each row designated for storing data attributes corresponding to data requests from a certain source, in the conventional buffer matrix, is operated in a FIFO manner. For example, when a first new data request from "source 0" arrives at the gateway 220, data attributes of the first new data request enter the input end of the FIFO buffer designated for "source 0." Subsequently, when a second new data request from "source 0" arrives at the gateway 220, data attributes of the second new data request enter the input end of the FIFO buffer designated for "source 0," after the data attributes of the first new data request. When response messages are received at the gateway 220 in a time sequential manner, the first response message corresponding to the first data request is received before the second response message corresponding to the second data request. Thus, when the first response message is received, data attributes of the first data request are pushed out of the FIFO buffer before data attributes of the second data request to match with the first response message.

The length of each FIFO buffer, or the number of columns of the conventional buffer matrix 301, is defined as the maximum number of data requests the gateway 220 is able to process. For example, the length of the FIFO buffer can be selected based on a desired throughput of the gateway, i.e., the maximum number of data requests the FIFO buffer can process.

When the gateway 220 is configured to process data requests from a large number N of data sources, the size of the buffer matrix 301 comprising a number N of parallel FIFO buffers can be significant. In addition, buffer space of the buffer matrix 301 is not efficiently utilized, e.g., when only a small fraction of the received data requests originates from a certain source, only a small portion of the FIFO buffer designated for the certain source is utilized for storing data attributes, leaving a large portion of the FIFO buffer unused.

In embodiments described herein, to improve buffer space utilization, the gateway 220 is configured to use a single buffer 302 to store data attributes of data requests from various data sources. The single buffer 302 is comprised of a plurality of serially connected data cells 302a-b, which takes a similar physical structure as a single FIFO buffer, with a single input port to receive data from the first interconnect 221 and a single output port to output data from the buffer (as opposed to the conventional buffer matrix that is comprised of a plurality of parallel FIFO buffers 301). Each data cell, i.e., 302 or 302b, stores two data portions, i.e., the data attributes of a data request, and the source identifier of a data request. Data attributes of different data requests from various sources are sequentially stored at data cells of the same single buffer 302, each identified by the corresponding source identifier of the respective data request. The stored data attributes are selectively output from the single buffer 302 to match with a received response message by comparing the respective source identifier stored at the same data cell and a response source identifier contained in the response message. For example, when a data request is received, the data attributes of the data request enter the tail end (e.g., the input end of the single buffer that is connected to the interconnect where the data request is received) of the single buffer 302. When a response message is received, a search is performed upon the previously stored data attributes within the single buffer 302 to find the previously stored data attributes corresponding to the data request that triggers the received response message. The serial-input-selective-output mechanism operated at the single buffer 302 is further described in relation to FIGS. 4-10.

The single buffer 302 consumes considerably less circuit area compared to a buffer matrix 301, when the maximum number of data requests the gateway 220 is able to process (e.g., length of the buffer) is the same. In addition, as the single buffer 302 is used to store data attributes of all data requests from different sources, buffer space utilization is much more efficient than that of the buffer matrix 301, which only sparsely utilizes buffer space at each row as described above.

Figure 4:
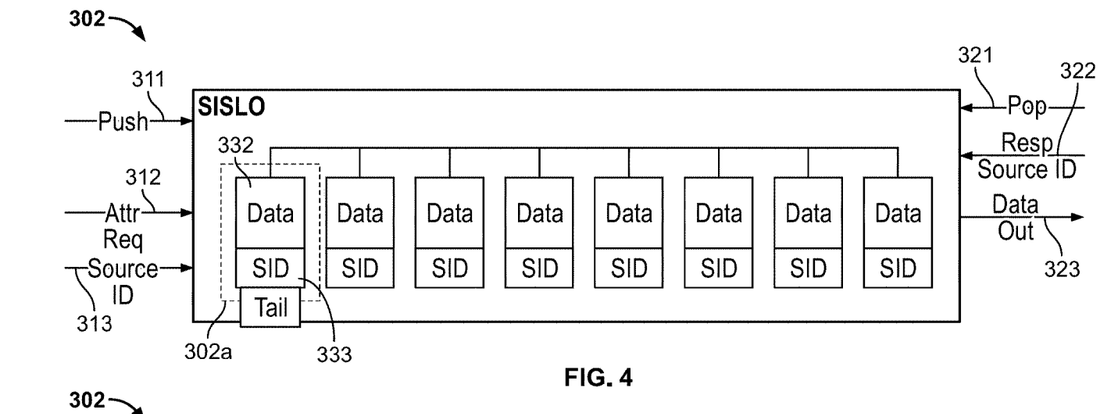
FIG. 4 is a block diagram illustrating an example structure of the single buffer implementing the serial-input-selective-output mechanism, according to some embodiments described herein.

FIG. 4 is a block diagram illustrating an example structure of the single buffer 302 implementing the serial-input-selective-output mechanism, according to some embodiments described herein. The buffer 302 includes a plurality of serially connected data cells (e.g., 302a-b, etc.), which takes a similar physical form as the single buffer 302 described in relation to FIG. 3. Each data cell (e.g., 302a, 302b, etc.) is configured to store two data portions, e.g., the source identifier 333 and other data attributes 332 of the same data request. The source identifier 333 and data attributes 332 are stored within the same data cell and can be distinguished/identified by the respective memory address designated for each data portion. For example, the data attributes 332 are stored at a first memory segment of each data cell designated for storing data attributes, and the source identifier 333 is stored at a second memory segment of each data cell designated for storing a source identifier. The data cells are serially connected to form a shift register, which is operated under a push command 311 or a pop command 321 issued by control circuitry. For example, in response to a push command 311, the buffer 302 is configured to accept data attributes 312 and the source identifier 313 of a data request to enter the single buffer 302, e.g., to store at a tail data cell which is the first cell at the input end of the single buffer. Further detail of serially inputting a new data request at the single buffer 302 is further described in relation to FIG. 4. For another example, a pop command 321 causes data attributes to be pulled out from a data cell within the single buffer 302 when the previously stored source identifier 333 at the data cell matches the response source identifier 322 included in the pop command 321. In response to the pop command 321, the single buffer 302 is configured to selectively output the previously stored data attributes 323 at the identified data cell. For example, the buffer 302 is configured to obtain a response source identifier from a response message, and initiate a search from an output end of the buffer, data cell by data cell, towards the direction of the input end of the buffer, to identify whether a data cell stores a source identifier that matches the response source identifier. When the matching source identifier is identified for the first time during the process, the respective data cell is identified as the matching data cell for the response message, and data attributes stored in the respective data cell will be extracted to pair with the response message. Further detail of the selective output process at the single buffer 302 is described in relation to FIG. 6.

Figure 5:
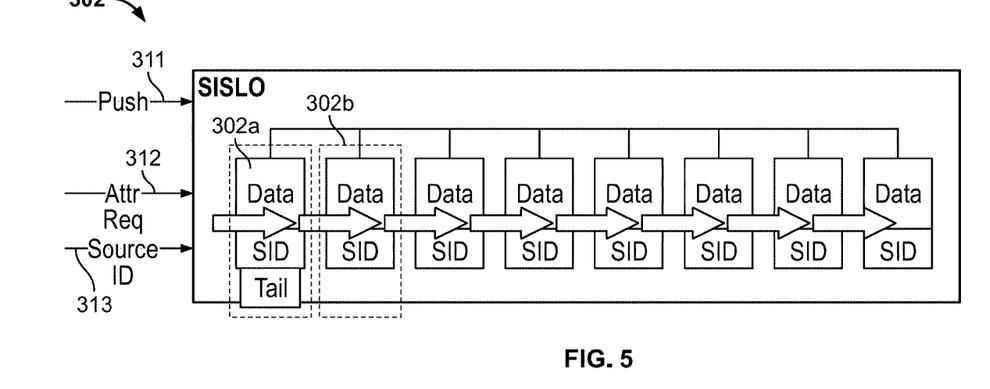
FIG. 5 is a block diagram illustrating an example operation of serially inputting a new data request at the single buffer described in FIG. 4, according to some embodiments described herein.

FIG. 5 is a block diagram illustrating an example operation of serially inputting a new data request at the single buffer 302 described in FIG. 4, according to some embodiments described herein. As described in relation to FIG. 4, a push command 311 is issued to insert the data attributes 312 and the source identifier 313 to the tail data cell 302a, e.g., the first data cell that is the closest to the input end of the single buffer 302. Insertion of new data to the single buffer 302 is performed by shifting all existing data stored at the single buffer 302 to the respective next data cell towards the opposite direction from the tail data cell 302a and pushing the new data (e.g., the data attributes 312 and the source identifier 313 of a new data request) into the tail data cell 302a of the single buffer 302. For example, previously stored data at the tail data cell 302a is shifted to the adjacent data cell 302b, e.g., in a similar way that a shift register operates, such that the tail data cell 302a is vacated to receive the inserted data attribute 312 and the inserted source identifier 313 of a new data request.

Figure 6:
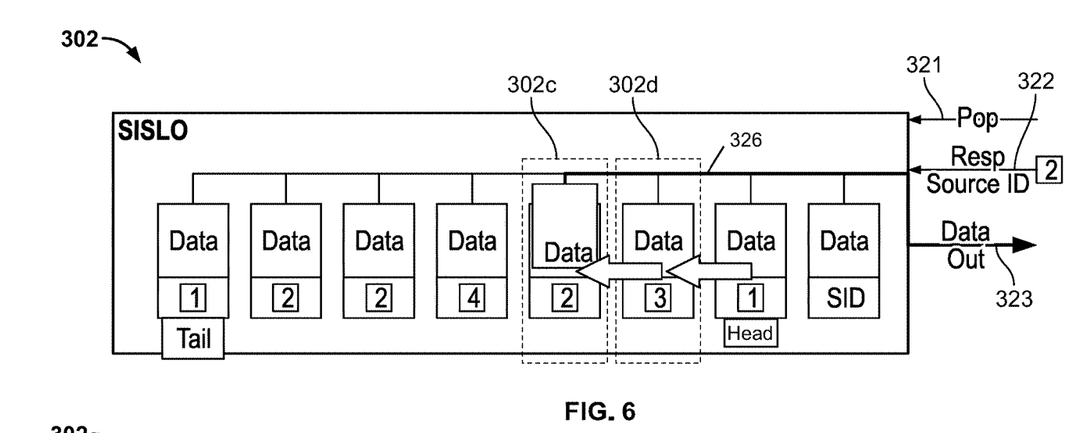
FIG. 6 is a block diagram illustrating an example operation of selectively outputting a previously stored data attribute to match a response message at the single buffer described in FIG. 4, according to some embodiments described herein.

FIG. 6 is a block diagram illustrating an example operation of selectively outputting a previously stored data attribute to match a response message at the single buffer 302 described in FIG. 4, according to some embodiments described herein. As described in relation to FIG. 4, a pop command 321 is issued to cause data attributes to be pulled out from a data cell within the single buffer 302 when the previously stored source identifier at the data cell (e.g., see 302c in FIG. 6) matches the response source identifier 322 along with the pop command 321.

For example, when a response message is received at the gateway 220 in FIG. 2, a response source identifier 322 is parsed from the response message (e.g., from a data field in the response message corresponding to the response source identifier), based on which the pop command 321 is issued to locate previously stored data attributes at the single buffer 302 that belong to the data request causing the respective response message. The pop command 321 causes a serial search at the single buffer 302, starting from a head data cell (e.g., the furthest non-empty data cell from the tail data cell in the single buffer 302) towards the tail data cell. At each data cell, the previously stored source identifier at the respective data cell (e.g., from the head data cell and moving towards data cells 302d, 302c) is read from the memory segment that is designated for storing a source identifier, and then compared against the response source identifier 322. When the previously stored source identifier at the respective data cell does not match the response source identifier 322, the search proceeds to the next data cell towards the direction of the tail data cell, until a match is identified. When the previously stored source identifier at the respective data cell (e.g., data cell 302c) matches the response source identifier 322, the data attributes stored at the respective data cell (e.g., see data cell 302c in the example in FIG. 6) is pulled out as data output 323 from the single buffer 302. Thus, the pop command 321 always causes the extraction of the first data cell (from the head towards the tail of the single buffer 302) that stores a source identifier matching the response source identifier. When response messages are received in a time sequential manner based on the sequentially sent data requests from the gateway 220, the pop command 321 in turn locates the data attributes of the oldest data request among all currently stored data requests that have the matching source identifier. Each data cell is connected to a data bus 326, and in response to the pop command 321, the identified matching data cell (302c in this example) is configured to transmit data attributes through the data bus 326 such that the data attributes are popped out of the single buffer 302 as data output 323.

After the pop command 321 causes data output 323 from the located data cell 302c, the data cell 302c is vacated. Data content stored at all the data cells to the "right" of the data cell 302c, e.g., data cells that are further away from the tail of the single buffer 302 than the data cell 302c, is re-aligned by shifting data content to the respective "left" data cell. For example, when data content at data cell 302c is vacated, stored data from data cell 302d is shifted to be stored at data cell 302c. Similarly, data content stored at the data cell to the "right" of the data cell 302d is shifted to be stored at data cell 302d, and on. Therefore, after the pop command 321 is performed, the number of data cells that are occupied in the single buffer 302 will be reduced by one.

Figure 7:
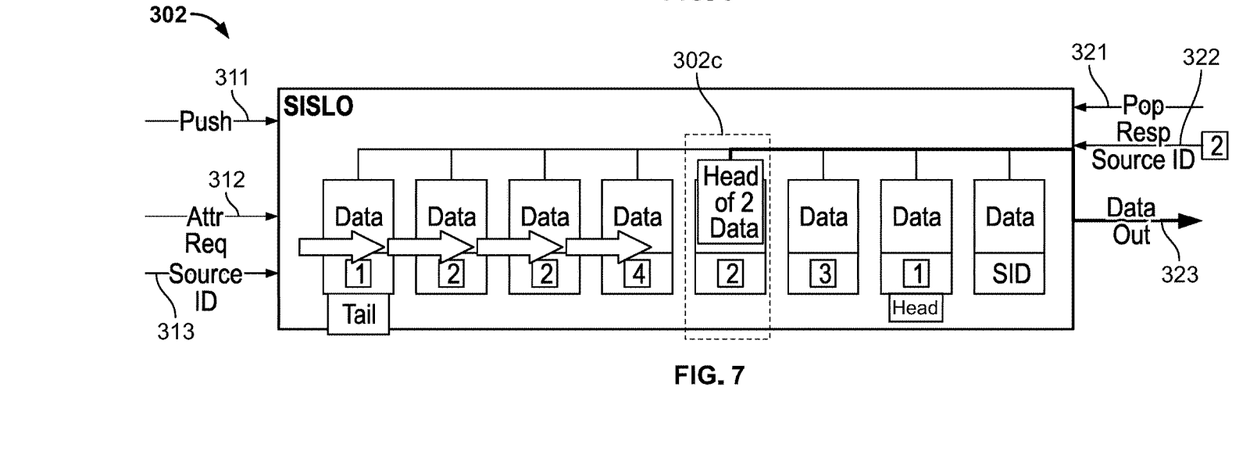
FIG. 7 is a block diagram illustrating an example operation of serially inputting a new data request and selectively outputting a previously stored data attribute to match a response message at the same time, at the single buffer described in FIG. 4, according to some embodiments described herein.

FIG. 7 is a block diagram illustrating an example operation of serially inputting a new data request and selectively outputting a previously stored data attribute to match a response message at the same time, at the single buffer 302 described in FIG. 4, according to some embodiments described herein. In some implementations, a push command 311 and a pop command 321 can be issued simultaneously, when there is a new data request and a new response message received at the gateway 220 at the same time. In this case, the pop command 321 causes a search similar to that described in relation to FIG. 6, to locate the data cell 302c storing a source identifier matching the response source identifier 322, and the data attributes stored at the data cell 302c are in turn pulled out as output data 323 from the single buffer 302. The data cell 302c is consequently vacated. The push command 311 causes stored content from the data cells to the "left" of the data cell 302c, e.g., data cells that are closer to the tail of the single buffer 302 than the data cell 302c, to shift towards the direction away from the tail of the single buffer 302. For example, by shifting the stored content, the vacated data cell 302c is again filled and the tail data cell of the single buffer 302 is vacated. The push command 311 then causes the new attributes 312 and the source identifier 313 to be inserted into the vacated tail data cell of the single buffer 302.

Figure 8:
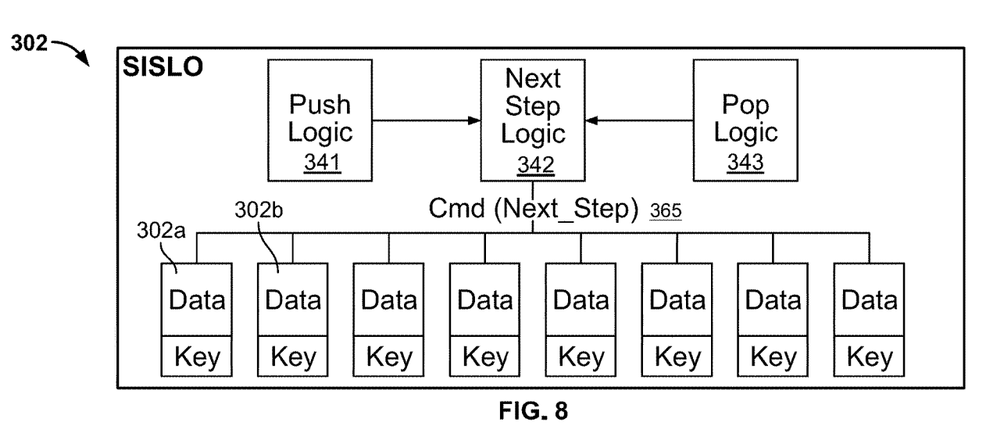
FIG. 8 is a block diagram illustrating an example block diagram of the single buffer implementing the serial-input-selective-output mechanism, according to some embodiments described herein.

FIG. 8 is a block diagram illustrating an example block diagram of the single buffer 302 implementing the serial-input-selective-output mechanism, according to some embodiments described herein. In some embodiments, data cells in the singe buffer 302 can be implemented as serially connected registers, e.g., 302a-b. Logic circuitry is configured to issue commands to operate the registers within the single buffer 302. For example, a push logic 341 is configured to issue a push command (e.g., similar to 311 described in relation to FIGS. 5 and 7), and a pop logic 343 is configured to issue a pop command (e.g., similar to 321 described in relation to FIGS. 6 and 7). The push logic 341 and the pop logic 343 are in turn coupled to a next-step logic 342, which is configured to output a next-step command 365 to the serially connected data registers for the next consecutive clock cycle. The next-step command 365 can be a push command from the push logic 341, a pop command from the pop logic 343, or a combination of the push command and the pop command. The next-step command 365 is used to control the operation of each data register in the single buffer 302, as further described in FIG. 9 below.

Figure 9:
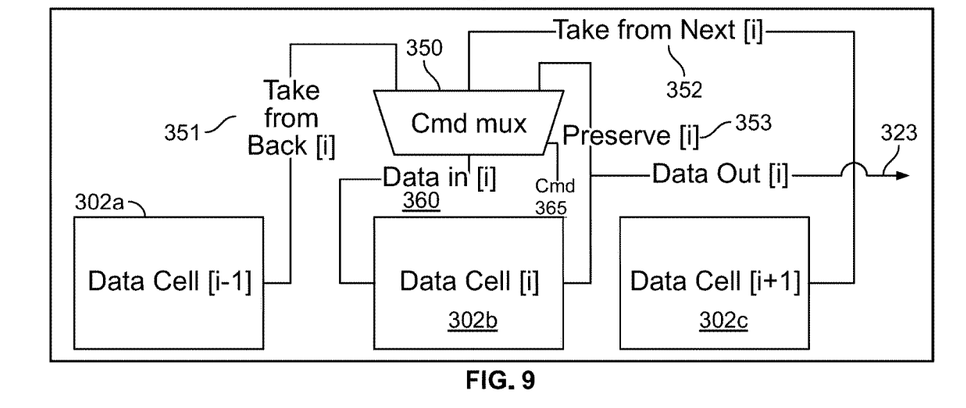
FIG. 9 is a block diagram illustrating an example control element for at least one or more of the data cells in the single buffer implementing the serial-input-selective-output mechanism, according to some embodiments described herein.

FIG. 9 is a block diagram illustrating an example control element for each register data cell in the single buffer 302 implementing the serial-input-selective-output mechanism, according to some embodiments described herein. For each register data cell in the single buffer 302, e.g., 302a-c, a respective multiplexer 350 is configured to send data input to each respective data cell, triggered by a control command 365 which is equivalent to the next-step command in FIG. 9. For example, for the data cell 302b, the respective multiplexer 350 has inputs including the output 351 of a "left" adjacent data cell 302a (e.g., data cell that is closer to the tail of the single buffer), the output 352 of a "right" adjacent data cell 302c (e.g., data cell that is closer to the head of the single buffer), and the output 353 of the respective data cell 302b. The multiplexer 350 is controlled by a select control command 365, e.g., the next-step command 365 issued by the logic circuitry 342 in FIG. 9 to output data 360 from one of the three inputs 351-353.

For example, when the control command 365 is a push command, the stored content at data cell 302b needs to shift towards the head of the single buffer as described in FIG. 5. Multiplexer 350 is configured to output data 360 from the input 351, e.g., the data cell 302b will take the stored content from data cell 302a. When the control command 365 is a pop command and the stored content at data cell 302b needs to shift towards the tail of the single buffer as described in FIG. 6, the multiplexer 350 is configured to output data 360 from the input 352, e.g., the data cell 302b will take stored content from data cell 302c. When the control command 365 is a pop command, and the data cell 302b is located closer to the tail of the buffer than the located data cell in response to the pop command, the stored content of the data cell 302b remains unchanged. In this case, the multiplexer 350 is configured to output data 360 from the input 353, e.g., the data cell 302b will preserve the content of currently stored data. When the control command 365 is a pop command, and the data cell 302b is identified as the located data cell in response to the pop command as described in FIG. 6, the multiplexer is configured to output data 360 from the input 352, e.g., the data cell 302b will take stored content from data cell 302c, and the current data content stored at the data cell 302b will be pulled out as data output 323.

In some embodiments, the single buffer 302 is implemented with a similar structure as a FIFO buffer with similar command system including a push command and a pop command. For example, the push command (e.g., 311) can take a similar form as a FIFO push command. The pop command (e.g., 321) can take a similar form as a FIFO pop command, but instead of popping out data from the head cell of the buffer, the pop command 321 causes a search to locate a data cell having a matching source identifier and pop the data from the located data cell.

Figure 10:
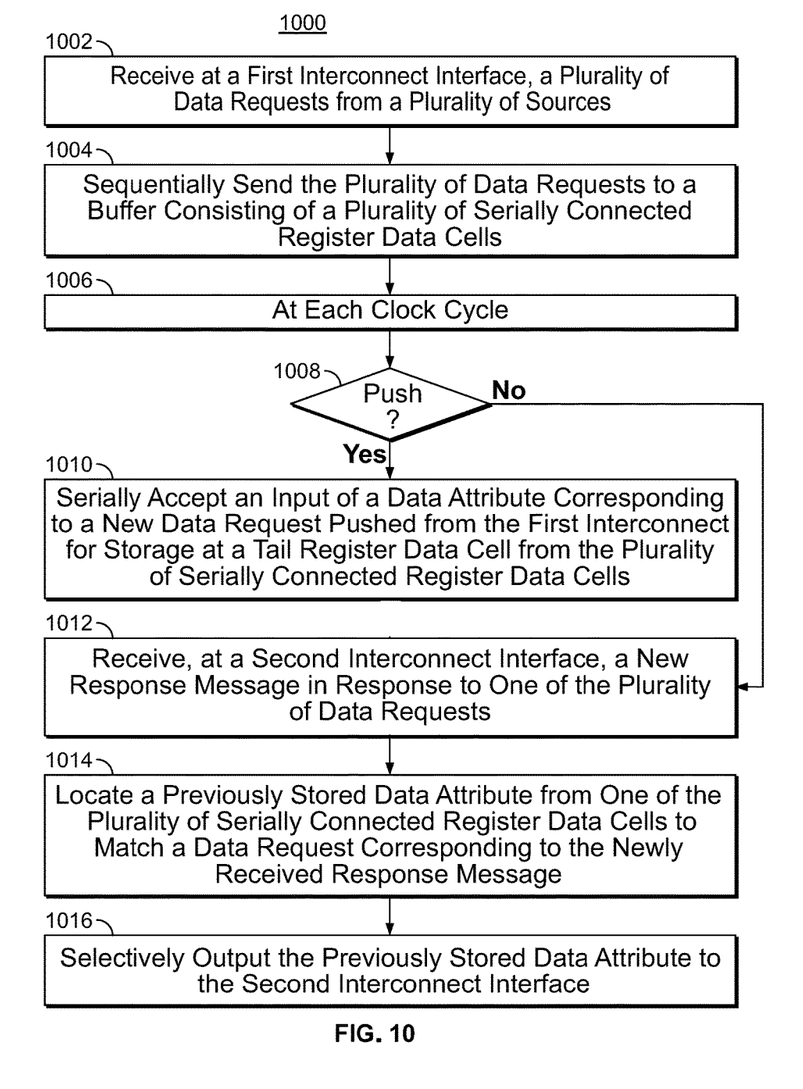
FIG. 10 is a logic flow diagram illustrating an example work flow of using the single buffer described in FIGS. 4-9 to serially input a new data request and selectively output a previously stored data attribute to match a response message, according to some embodiments described herein.

FIG. 10 is a logic flow diagram 1000 illustrating an example work flow of using the single buffer 302 described in FIGS. 4-9 to serially input a new data request and selectively output a previously stored data attribute to match a response message, according to some embodiments described herein. At 1002, a plurality of data requests from a plurality of sources is received at a first interconnect interface (e.g., see 221 in FIG. 2). Each data request includes a plurality of data attributes such as but not limited to the type of the data request, address of the source, identifier of the source, address of the destination, identifier of the destination, and/or the like. At 1004, the plurality of data requests are sequentially sent to a single buffer (e.g., see 302 in FIGS. 4-9) including a plurality of serially connected register data cells (e.g., see 302a-b in FIGS. 4-9). At 1006, at each clock cycle, logic circuitry (e.g., see 341-343 in FIG. 8) configured to operate the single buffer determines whether a push command or a pop command is issued at 1008. If a push command is issued at 1008, the single buffer is configured to serially accept an input of a data attribute corresponding to a new data request pushed from the first interconnect for storage at a tail register data cell (e.g., see 302a in FIG. 5) from the plurality of serially connected register data cells at 1010. Further detail of the operation of the push command on the single buffer is described in FIG. 5. If a pop command is issued at 1008, a new response message is received at a second interconnect interface (e.g., see 222 in FIG. 2) in response to one of the plurality of data requests at 1012. The single buffer is then configured to locate a previously stored data attribute from one of the plurality of serially connected register data cells to match a data request corresponding to the newly received response message at 1014. At 1016, the single buffer is configured to selectively output the previously stored data attribute to the second interconnect interface.

It is noted that the example steps 1002-1016 described in FIG. 10 are not limited to the example order shown in FIG. 10. One or more steps of 1002-1016 may be implemented in a different order or in parallel. For example, at 1008, a push command and a pop command may be issued simultaneously (e.g., as described in relation to FIG. 7). For another example, while new data requests are being received at 1002, response messages can be simultaneously received corresponding to older data requests at 1012. s Various embodiments described in conjunction with FIGS. 1-10 are performed by various electronic components of one or more electronic circuits, such as but not limited to an integrated circuit, application-specific integrated circuit (ASIC), and/or the like. Various components discussed throughout this disclosure such as, but not limited to data interconnects (e.g., 221, 222 in FIG. 2), register data cells (e.g., 302a-c in FIG. 7), multiplexers (e.g., 350 in FIG. 9), logic circuitry (e.g., 341-343 in FIG. 8), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A network device operative to selectively exchange data between a plurality of different data sources and a plurality of different data destinations, the network device comprising:
    a first transceiver configured to receive a plurality of data requests from a plurality of sources;
    a buffer comprised of a plurality of serially connected register data cells configured to store data attributes and source identifiers corresponding to the plurality of data requests;
    a push logic configured to issue a push command;
    wherein the buffer is configured to, in response to the push command, serially store a new data attribute corresponding to a new data request at a tail register data cell of the plurality of serially connected register data cells; and
    a pop logic configured to issue a pop command; wherein the buffer is configured to, in response to the pop command, search from a head register data cell of the plurality of serially connected register data cells towards the tail register data cell to locate and selectively output a previously stored data attribute from an identified register data cell storing a same source identifier with a response source identifier contained in a newly received response message; and a second transceiver configured to receive a plurality of response messages including the newly received response message.

2. The network device of claim 1, wherein each register data cell from the plurality of serially connected register data cells includes a first memory segment designated to store a respective data attribute of a respective data request, and a second memory segment designated to store a respective source identifier of the same respective data request.

3. The network device of claim 2, wherein the plurality of serially connected register data cells includes a first register data cell and a second register data cell, and
    wherein the first register data cell is configured to store a first source identifier corresponding to the first data request,
    wherein the second register data cell is configured to store a second source identifier corresponding to the second data request, and
    wherein the second source identifier is different from the first source identifier.

4. The network device of claim 2, wherein each register data cell from the plurality of serially connected register data cells is connected to a data bus, and wherein each register data cell is configured to transmit, via the data bus, stored content at the first memory segment or the second memory segment out of the buffer.

5. The network device of claim 4, wherein the buffer has a single input port at a first end of the buffer, the single input port being configured to receive data from the first transceiver;
    wherein the buffer has a single output port connected to the data bus, the single output port being configured to output data out of the buffer from the data bus.

6. The network device of claim 1, wherein the push logic is configured to issue the push command in response to receiving the new data request at the first transceiver,
    wherein in response to the push command, the buffer is further configured to:
        shift previously stored content at each of the plurality of serially connected register data cells to a respective next register data cell such that the tail register data cell is vacated; and
        store the new data attribute corresponding to the new data request at a first memory segment of the tail register data cell and a new source identifier corresponding to the new data request at a second memory segment of the tail register data cell.

7. The network device of claim 6, wherein the pop logic is configured to issue the pop command in response to receiving, at the second transceiver, a new response message including a response source identifier,
    wherein in response to the pop command, the buffer is configured to:
        read a first previously stored source identifier from a first memory segment designated to store a source identifier at a head register data cell that is closest to the second transceiver among the plurality of serially connected register data cells;
        extract the response source identifier from a data field corresponding to the response source identifier of the new response message;
        determine whether the first previously stored source identifier matches the response source identifier;
        when the first previously stored source identifier matches the response source identifier, retrieve and output a first previously stored data attribute from a second memory segment designated to store data attributes at the head register data cell;
        when the first previously stored source identifier does not match the response source identifier:
        continue moving to an adjacent register data cell towards a direction of the tail register data cell from the plurality of serially connected register data cells, until a second previously stored source identifier stored at a respective memory segment of the adjacent register data cell matches the response source identifier for the first time.

8. The network device of claim 7, wherein, in response to the pop command, the buffer is further configured to:
    identify a matching register data cell that stores the second previously stored source identifier when the second previously stored source identifier that matches the response source identifier is identified for the first time;
    send a data attribute previously stored at the matching register data cell out of the matching register data cell via a data bus;
    transmit, via the data bus, the data attribute previously stored at the matching register data cell as a data output from the buffer;
    vacate the matching register data cell; and
    shift all stored content of a first subset of register data cells that are closer to the head register data cell than the matching register data cell to a respective adjacent register data cell towards the direction of the tail register data cell such that the matching register data cell is filled with stored content from a first register data cell adjacent to the matching register data cell.

9. The network device of claim 8, wherein the push logic and the pop logic are configured to issue the push command and the pop command at a same time, and
    wherein in response to the pop command and the issue command being issued at the same time, the buffer is configured to:

locate the matching register data cell in response to the response source identifier in the response message;
transmit the data attribute previously stored at the matching register data cell as a data output from the buffer;
vacate the matching register data cell;
shift all stored content of a second subset of register data cells that are closer to the tail register data cell than the matching register data cell to a respective adjacent register data cell towards the direction of the head register data cell such that the matching register data cell is filled with stored content from a second register data cell adjacent to the matching register data cell;
vacate the tail register data cell; and
store the new data attribute and the new source identifier corresponding to the new data request at the tail register data cell.

10. The network device of claim 1, further comprising:
a respective multiplexer connected to the respective register data cell for each register data cell from the plurality of register data cells,
wherein the respective multiplexer includes a first data input connected to a data output of the same respective register data cell, a second input connected to a data output from a first adjacent register data cell to the respective register data cell, and a third data input connected to a data output from a second adjacent register data cell to the respective register data cell, respectively,
wherein the respective multiplexer is configured to selectively output data to the respective register data cell, from one of the inputs of the respective multiplexer, in response to the pop command or the push command.

11. A method for exchanging data from different data sources to different data destinations in a network device, the method comprising:
receiving, at a first transceiver, a plurality of data requests from a plurality of sources for storage in a buffer at a network device, the buffer comprised of a plurality of serially coupled register data cells;
in response to receiving a new data request at the first transceiver, issuing, by a push logic, a push command to serially store a new data attribute and a new source identifier corresponding to the new data request at a tail register data cell of the plurality of serially connected register data cells;
receiving, at a second transceiver, a new response message; and
in response to receiving the new response message, issuing, by a pop logic, a pop command to search from a head register data cell of the plurality of serially connected register data cells towards the tail register data cell to locate and selectively output a previously stored data attribute from an identified register data cell storing a same source identifier with a response source identifier contained in a newly received response message.

12. The method of claim 11, further comprising:
at each register data cell from the plurality of serially connected register data cells:
storing a respective data attribute of a respective data request at a first memory segment designated to store data attributes; and
storing a respective source identifier of the same respective data request at a second memory segment designated to store a source identifier.

13. The method of claim 11, further comprising:
storing, at a first register data cell from the plurality of serially connected register data cells, a first data attribute corresponding to a first data request and a first source identifier corresponding to the first data request;
storing, at a second register data cell from the plurality of serially connected register data cells, a second data attribute corresponding to a second data request and a second source identifier corresponding to the second data request, and
wherein the second source identifier is different from the first source identifier.

14. The method of claim 11, wherein the issuing, by a pop logic, a pop command to search from a head register data cell of the plurality of serially connected register data cells towards the tail register data cell to locate and selectively output a previously stored data attribute from an identified register data cell storing a same source identifier with a response source identifier contained in a newly received response message comprises:
transmitting, via a data bus connected to each register data cell, the previously stored data attribute from the identified register data cell out of the buffer.

15. The method of claim 14, further comprising:
receiving, via a single input port that the buffer has, the new data request from the first transceiver; and
outputting, via a single output port that the buffer has, the previously stored data attribute from the data bus.

16. The method of claim 11, further comprising:
in response to the push command:
shifting previously stored content at each of the plurality of serially connected register data cells to a respective next register data cell such that the tail register data cell is vacated; and
storing the new data attribute corresponding to the new data request at a first memory segment of the tail register data cell and a new source identifier corresponding to the new data request at a second memory segment of the tail register data cell.

17. The method of claim 16, further comprising:
reading a first previously stored source identifier from a first memory segment designated to store a source identifier at a head register data cell that is closest to the second transceiver among the plurality of serially connected register data cells;
extracting the response source identifier from a data field corresponding to the response source identifier of the new response message;
determining whether the first previously stored source identifier matches the response source identifier;
when the first previously stored source identifier matches the response source identifier, retrieving and outputting a first previously stored data attribute from a second memory segment designated to store data attributes at the head register data cell;
when the first previously stored source identifier does not match the response source identifier:
continuing moving to an adjacent register data cell towards a direction of the tail register data cell from the plurality of serially connected register data cells, until a second previously stored source identifier stored at the adjacent register data cell matches the response source identifier for the first time.

18. The method of claim 17, further comprising:
identifying a matching register data cell that stores the second previously stored source identifier when the second previously stored source identifier that matches the response source identifier is identified for the first time;

send a data attribute previously stored at the matching register data cell out of the matching register data cell via a data bus;

transmit, via the data bus, the data attribute previously stored at the matching register data cell as a data output from the buffer; and shifting all stored content of a first subset of register data cells that are closer to the head register data cell than the matching register data cell to a respective adjacent register data cell towards the direction of the tail register data cell such that the matching register data cell is filled with stored content from a first register data cell adjacent to the matching register data cell.

19. The method of claim 18, further comprising:

in response to the pop command and the issue command being issued at a same time:

locating the matching register data cell in response to the response source identifier in the response message;

transmit the data attribute previously stored at the matching register data cell as a data output from the buffer;

vacating the matching register data cell;

shifting all stored content of a second subset of register data cells that are closer to the tail register data cell than the matching register data cell to a respective adjacent register data cell towards the direction of the head register data cell such that the matching register data cell is filled with stored content from a second register data cell adjacent to the matching register data cell;

vacating the tail register data cell; and storing the new data attribute and the new source identifier corresponding to the new data request at the tail register data cell.

20. The method of claim 11, further comprising:

at each register data cell of the buffer:

receiving, a push command or a pop command at a respective multiplexer connected to each register data cell from the plurality of register data cells,
wherein inputs of the respective multiplexer include a data output of the same respective register data cell and data outputs of two adjacent register data cells to the respective register data cell, respectively;

selectively outputting, at the respective multiplexer, data to the respective register data cell, from one of the inputs of the respective multiplexer, in response to the pop command or the push command.

* * * * *